US010164230B2

(12) United States Patent
Kang et al.

(10) Patent No.: US 10,164,230 B2
(45) Date of Patent: Dec. 25, 2018

(54) SEPARATOR INCLUDING MICROBIAL CELLULOSE, METHOD OF PRODUCING THE SEPARATOR, AND USE OF THE SEPARATOR

(71) Applicant: Samsung Electronics Co., Ltd., Suwon-si, Gyeonggi-do (KR)

(72) Inventors: Jinkyu Kang, Hwaseong-si (KR); Hyeyun Kim, Seoul (KR); Jiae Yun, Hwaseong-si (KR); Soonchun Chung, Seoul (KR); Kwangmyung Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/167,868

(22) Filed: May 27, 2016

(65) Prior Publication Data
US 2016/0351874 A1   Dec. 1, 2016

(30) Foreign Application Priority Data

May 27, 2015  (KR) ........................ 10-2015-0073931
May 11, 2016  (KR) ........................ 10-2016-0057815

(51) Int. Cl.
*H01M 2/16* (2006.01)
*H01M 10/052* (2010.01)
*B01D 71/10* (2006.01)
*H01M 2/14* (2006.01)
*H01M 10/0525* (2010.01)

(52) U.S. Cl.
CPC ......... *H01M 2/1626* (2013.01); *H01M 2/145* (2013.01); *H01M 10/052* (2013.01); *H01M 10/0525* (2013.01); *Y02T 10/7011* (2013.01)

(58) Field of Classification Search
None
See application file for complete search history.

(56) References Cited

U.S. PATENT DOCUMENTS

| 4,374,702 | A  | 2/1983  | Turbak et al. |
| 5,637,197 | A  | 6/1997  | Watt et al. |
| 7,691,473 | B2 | 4/2010  | Yano et al. |
| 8,304,215 | B2 | 11/2012 | Kim et al. |
| 8,664,436 | B2 | 3/2014  | Rezkallah |
| 8,691,974 | B2 | 4/2014  | Gatenholm et al. |
| 8,957,249 | B2 | 2/2015  | Tietz et al. |
| 9,226,886 | B2 | 1/2016  | Lee et al. |

(Continued)

FOREIGN PATENT DOCUMENTS

| EP | 0610001 B1   | 9/2001 |
| EP | 2 196 579 A1 | 6/2010 |

(Continued)

OTHER PUBLICATIONS

Extended European Search Report issued in 16171649.3 dated Oct. 10, 2016.

(Continued)

*Primary Examiner* — Krishnan S Menon
(74) *Attorney, Agent, or Firm* — Leydig, Voit & Mayer, Ltd.

(57) ABSTRACT

Provided is a separator including microbial cellulose, a battery comprising the separator, and a method of producing the separator.

16 Claims, 5 Drawing Sheets
Specification includes a Sequence Listing.

(56) References Cited

U.S. PATENT DOCUMENTS

| | | | |
|---|---|---|---|
| 2007/0207692 A1* | 9/2007 | Ono | B01D 39/18 |
| | | | 442/327 |
| 2009/0309072 A1 | 12/2009 | Hwang et al. | |
| 2013/0251890 A1 | 9/2013 | Lee et al. | |
| 2014/0227605 A1 | 8/2014 | Nakamura et al. | |
| 2014/0323682 A1 | 10/2014 | Schulze et al. | |
| 2014/0335424 A1 | 11/2014 | Lee et al. | |
| 2015/0068973 A1 | 3/2015 | Bessonoff et al. | |
| 2015/0333306 A1 | 11/2015 | Lee et al. | |

FOREIGN PATENT DOCUMENTS

| | | | |
|---|---|---|---|
| JP | 5300348 B2 | 1/2010 | |
| JP | 2011/026760 A | 2/2011 | |
| JP | 2013-221132 A | 10/2013 | |
| JP | 2013-229325 A | 11/2013 | |
| JP | 2014-001361 A | 1/2014 | |
| JP | 2014-027887 A | 2/2014 | |
| JP | 2006-278636 A | 10/2016 | |
| KR | 10-1040572 B1 | 6/2011 | |
| KR | 2011-0076800 A | 7/2011 | |
| KR | 2013-0137119 A | 12/2013 | |
| KR | 2014-0108636 A | 9/2014 | |
| WO | WO 2012/017953 A1 | 2/2012 | |
| WO | WO 2012/050277 A1 | 4/2012 | |
| WO | WO 2012/057486 A2 | 5/2012 | |
| WO | WO 2013/081228 A1 | 6/2013 | |
| WO | WO 2014/088151 A1 | 6/2014 | |

OTHER PUBLICATIONS

Saito, et al., "Cellulose Nanofibers Prepared by TEMPO-Mediated Oxidation of Native Cellulose", *Biomacromolecules*, 8: 2485-2491 (2007).

Suwanposri, et al., "Identification and biocellulose production of *Gluconacetobacter* strains isolated from tropical fruits in Thailand", *Maejo International Journal of Science and Technology*, 7(01):70-82 (2013).

European Search Report issued in Application No. 17170620.3 dated Aug. 29, 2017.

Jiang et al, "Bacterial cellulose nanofibrous membrane as thermal stable separator for lithium-ion batteries," *Journal of Power Sources*, 279, pp. 21-27 (2015).

* cited by examiner

SEQUENCE LISTING

```
<160> NUMBER OF SEQ ID NOS: 10

<210> SEQ ID NO 1
<211> LENGTH: 745
<212> TYPE: PRT
<213> ORGANISM: Gluconacetobacter xylinus

<400> SEQUENCE: 1

Met Pro Glu Val Gln Ser Pro Ala Pro Ala Glu Ser Arg Phe Asp Arg
 1               5                  10                  15

Ile Ser Asn Lys Ile Leu Ser Leu Arg Gly Ala Ser Tyr Ile Val Gly
            20                  25                  30

Ala Val Gly Ile Phe Ala Leu Leu Ala Ala Thr Thr Val Thr Leu Ser
        35                  40                  45

Ile Asn Glu Gln Leu Ile Val Ala Leu Ile Cys Ile Ala Val Phe Phe
    50                  55                  60

Ile Val Gly Arg His Lys Ser Arg Arg Thr Gln Val Phe Leu Glu Val
65                  70                  75                  80

Leu Ser Ala Leu Val Ser Leu Arg Tyr Leu Thr Trp Arg Leu Thr Glu
                85                  90                  95

Thr Leu Asp Phe Asp Thr Trp Ile Gln Gly Gly Leu Gly Val Thr Leu
            100                 105                 110

Leu Leu Ala Glu Leu Tyr Ala Leu Tyr Met Leu Phe Leu Ser Tyr Phe
        115                 120                 125
```

```
Gln Thr Ile Ser Pro Leu His Arg Ala Pro Leu Pro Leu Ser Pro Asn
    130                 135                 140

Pro Asp Asp Trp Pro Thr Val Asp Ile Phe Ile Pro Thr Tyr Asp Glu
145                 150                 155                 160

Ser Leu Gly Ile Val Arg Leu Thr Val Leu Gly Ala Leu Gly Ile Asp
                165                 170                 175

Trp Pro Pro Asp Lys Val Asn Val Tyr Ile Leu Asp Asp Gly Glu Arg
                180                 185                 190

Glu Glu Phe Ala Arg Phe Ala Glu Glu Cys Gly Ala Arg Tyr Ile Ala
            195                 200                 205

Arg Pro Asp Asn Ala His Ala Lys Ala Gly Asn Leu Asn Tyr Ala Ile
210                 215                 220

Lys His Thr Thr Gly Asp His Ile Leu Ile Leu Asp Cys Asp His Ile
225                 230                 235                 240

Pro Thr Arg Ala Phe Leu Gln Ile Ala Met Gly Trp Met Val Asp Asp
                245                 250                 255

Pro Thr Ile Ala Leu Met Gln Thr Pro His His Phe Tyr Ser Pro Asp
                260                 265                 270

Pro Phe Gln Arg Asn Leu Ala Val Gly Tyr Arg Thr Pro Pro Glu Gly
            275                 280                 285

Asn Leu Ala Tyr Gly Val Ile Gln Ala Gly Asn Asp Phe Trp Asp Ala
290                 295                 300

Thr Phe Phe Cys Gly Ser Cys Ala Ile Leu Arg Arg Lys Ala Ile Glu
305                 310                 315                 320

Glu Ile Gly Gly Phe Ala Thr Glu Thr Val Thr Glu Asp Ala His Thr
                325                 330                 335

Ala Leu Arg Met Gln Arg Lys Gly Trp Ser Thr Ala Tyr Leu Arg Ile
            340                 345                 350

Pro Leu Ala Ser Gly Leu Ala Thr Glu Arg Leu Val Thr His Ile Gly
            355                 360                 365

Gln Arg Met Arg Trp Ala Arg Gly Met Ile Gln Ile Phe Arg Val Asp
370                 375                 380

Asn Pro Met Met Gly Pro Gly Leu Lys Leu Gly Gln Arg Leu Cys Tyr
385                 390                 395                 400

Leu Ser Ala Met Thr Ser Phe Phe Ala Ile Pro Arg Val Val Phe
                405                 410                 415

Leu Ala Ser Pro Leu Ala Phe Leu Phe Asn Gln Asn Ile Ile Ala
            420                 425                 430

Ala Ser Phe Val Ala Val Leu Ala Tyr Ala Ile Pro His Met Phe His
            435                 440                 445

Ser Ile Ala Thr Ala Ala Lys Gly Asn Lys Gly Trp Arg Tyr Ser Phe
            450                 455                 460

Trp Ser Glu Val Tyr Glu Thr Val Met Ala Leu Phe Leu Val Arg Val
465                 470                 475                 480

Thr Ile Val Thr Leu Leu Phe Pro Ser Lys Gly Lys Phe Asn Val Thr
                485                 490                 495

Glu Lys Gly Gly Val Leu Glu His Glu Glu Phe Asp Leu Gly Ala Thr
            500                 505                 510

Tyr Pro Asn Ile Ile Phe Ala Cys Ile Met Ala Leu Gly Leu Leu Arg
            515                 520                 525

Gly Gly Tyr Ala Leu Ile Phe Gln His Leu Asp Ile Ile Ser Glu Arg
530                 535                 540
```

```
Ala Tyr Ala Leu Asn Cys Ile Trp Ser Val Ile Ser Leu Ile Ile Gln
545                 550                 555                 560

Leu Ala Ala Val Ala Val Gly Arg Glu Thr Lys Gln Ile Arg Gln Gly
            565                 570                 575

Arg Arg Ile Glu Ala His Ile Pro Val Thr Val Tyr Asp Tyr Glu Gly
            580                 585                 590

Asn Ser Ser His Gly Ile Thr Glu Asp Val Ser Met Gly Gly Val Ala
        595                 600                 605

Ile His Met Pro Trp Arg Asp Met Thr Pro Asp Gln Pro Val Gln Val
610                 615                 620

Val Val His Thr Ile Leu Asp Gly Glu Val Asn Leu Pro Ala Thr
625                 630                 635                 640

Met Ile Arg Ser Ala Arg Gly Lys Ala Val Phe Thr Trp Ser Ile Thr
            645                 650                 655

Asn Ile Gln Val Glu Ala Ala Val Arg Phe Val Phe Gly Arg Ala
            660                 665                 670

Asp Ala Trp Leu Gln Trp Asn Asn Tyr Glu Asp Arg Pro Leu Arg
            675                 680                 685

Ser Leu Trp Ser Leu Ile Leu Ser Ile Lys Ala Leu Phe Arg Arg Lys
690                 695                 700

Gly Gln Met Ile Ala Gln Ser Arg Pro Lys Asn Lys Pro Ile Ala Leu
705                 710                 715                 720

Pro Val Glu Arg Arg Glu Pro Thr Thr Ser Gln Gly Gly Gln Lys Gln
                725                 730                 735

Glu Gly Lys Ile Ser Arg Ala Ala Ser
            740                 745

<210> SEQ ID NO 2
<211> LENGTH: 2238
<212> TYPE: DNA
<213> ORGANISM: Gluconacetobacter xylinus

<400> SEQUENCE: 2
atgccagagg ttcagtcgcc agcgcctgcg gaaagtcggt ttgaccgcat tccaataag     60 atactgtcac tgcgcggtgc cagttacata gttggggcag tggggatttt tgccctgctc    120
gccgccacta cagtcacgct gtcgataaat gaacagttga ttgtggcatt aatatgtatc    180
gcggtatttt tcatcgtcgg ccggcataaa agccgtcgca cacaggtctt tctcgaagtg    240
ctttcggcgc tggtatcgct gcgttacctg acatggcgcc tgacggaaac actggatttc    300
gacacatgga tacagggcgg cctgggcgtt accctgctgc tggcggaact ctacgcgctg    360
tacatgctgt tcctcagcta tttccagacg atttcccccc ttcatcgcgc ccgctgccg    420 ctgtcaccca atccggatga ctggcccacg gtcgatatct tcatcccgac ctacgatgaa    480 tgctgggta tcgtgcgcct gacggtgctg ggtgcgctag gtatcgactg gccgcccgac    540
aaggtgaacg tctacattct ggatgacgga gagcgtgagg aattcgcccg ctttgccgag    600
gaatgtggcg cgcgctacat cgcccgtccc gataacgcgc atgccaaggc gggtaacctc    660
aactacgcca tcaagcacac gacaggcgat cacatcctca tcctggactg tgaccatatt    720
ccgacgcgtg cgttcctgca gatcgcgatg ggctggatgg tcgatgatcc gacgatcgcc    780
ctgatgcaga cccgcatca cttctattcc cccgacccgt tccagcgtaa cctggccgtg    840
gggtaccgca ccccgccgga aggtaacctg gcctacggtg tcatccaggc cggcaatgac    900
ttctgggatg caaccttctt ctgcggttcg tgcgccatcc tgcgccgcaa ggcgatcgag    960
```

```
gaaatcggcg gtttcgcaac cgagaccgtg acggaagatg cccataccgc actgcgcatg    1020
cagcgcaagg gatggtcaac ggcctacctg cgcattccac tggccagtgg tctggcgacg    1080
gaacgccttg tcacgcatat cggccagcgt atgcgctggg cgcgcggcat gatccagatc    1140
ttccgtgtcg ataacccgat gatggggccg ggactgaagc tggggcagcg gctgtgctac    1200
ctgtcagcca tgacgtcgtt cttcttcgcc attccccgcg tcgtcttcct tgcgtctccg    1260
ctggccttcc tgttcttcaa ccagaacatc atcgcggcat ccttcgtcgc ggtgctggcc    1320
tatgccatcc gcatatgtt ccattccatc gcgacggcgg cgaaaggcaa caagggctgg    1380
cggtattcgt tctggagtga agtgtacgaa accgtcatgg cgctgttcct ggtgcgtgtg    1440
accatcgtga cgctgctgtt cccctccaag ggcaaattca acgtgacgga aaaaggcggt    1500
gtccttgaac acgaggaatt cgacctcggg gccacctatc cgaacatcat cttcgcctgc    1560
atcatggccc ttggcctgct gcgtggtgga tatgcgctga tcttccagca tctggacatc    1620
atttcggaac gtgcctacgc gctgaactgc atctggtcgg tgatcagcct gatcatccag    1680
ctggcggccg tcgccgtggg ccgcgaaacc aagcagatcc gccagggccg ccgtattgaa    1740
gcccatatcc ctgttacggt ttatgattac gaaggcaatt caagccacgg tattaccgaa    1800
gacgtgtcca tgggtggtgt ggcgatccac atgccctggc gcgatatgac cccggaccag    1860
cccgtacaag tggtggtcca tacaatactg gatggcgagg aggtgaatct cccggccacc    1920
atgatccgca gtgcccgggg caaggccgtg tttacatggt cgattaccaa cattcaggtt    1980
gaagcggcag tggtccggtt cgtgttcgga cgcgccgatg cctggctgca gtggaataat    2040
tatgaggatg accggccgtt acgaagcctg tggagtctga tcctcagcat caaggcactg    2100
ttccgcagga agggtcagat gattgcccaa agtcgtccca gaacaaaacc aattgcactg    2160
ccggttgagc gtagggagcc aacaaccagt cagggtggtc agaaacagga aggaaagatc    2220
agtcgtgcgg cctcgtga                                                  2238
```

<210> SEQ ID NO 3
<211> LENGTH: 323
<212> TYPE: PRT
<213> ORGANISM: Gluconacetobacter xylinus

<400> SEQUENCE: 3

```
Met Ser Ser Ala Asp Lys Glu Ala Ala Gly Thr Pro Ala Pro Arg Pro
 1               5                  10                  15

Thr Val Asp Met Asp Asn Pro Gln Asp Val Ser Arg Met Leu Thr Ala
            20                  25                  30

Gly Tyr Gly Leu Ser Gly Glu Gly Phe His Tyr Arg Ser Phe Arg Ser
        35                  40                  45

Val Val Arg Asp Met Pro Val Glu Asp Ala Glu Ser Leu His Glu
    50                  55                  60

Asp Thr Arg Asp Val His Ala Tyr Ala Glu Asp Gln Tyr Ala Glu Pro
65                  70                  75                  80

Glu Pro His Val Pro Ala Ala Glu Pro Ala Glu Pro Val Ala Pro
                85                  90                  95

Pro Val Ala Val Ser Pro Glu Ala Pro Pro Val Pro Pro Pro Ala
            100                 105                 110

Pro Pro Pro Pro Val Ala Pro Glu Val Val His Val Pro Gln Pro Pro
        115                 120                 125
```

Val Ala Glu Thr Ile Val Pro Pro Pro Ala Pro Pro Glu
    130             135             140

Thr Val Val Arg Pro Ala Pro Thr Ala Ser Ala Pro Gly Val Val Gln
145             150             155             160

Ser Gly Gly Gln Glu Arg Arg Gly Leu Pro Pro Phe Ala Glu Ala Pro
                165             170             175

Ala Ala Pro Val Pro Pro Arg Pro Ala Pro Gln Ser Ala Pro Phe
            180             185             190

Thr Val Ala Ala Pro Glu Pro Val Thr Ala Thr Asp Asp Trp Ala
            195             200             205

Pro Val Pro Lys Ala Gln Gln Arg Arg Gly Gln Arg Pro Thr Gly Pro
210             215             220

Gly Phe Phe Phe Ala Arg Ala Gly Asp Arg Thr Gln Met Gly Arg Leu
225             230             235             240

Phe Gln Pro Thr Pro Val Pro Thr Ala Gln Pro Val Leu Lys Pro Ala
                245             250             255

Ser Lys Val Thr Thr Met Thr Lys Leu Asp Lys Asn Ser Trp Asn Lys
                260             265             270

Ser Ala Gly Arg Gln Pro Ala Pro Thr Asp Asn Ser Pro Thr Leu Thr
                275             280             285

Glu Val Phe Met Thr Leu Gly Gly Arg Ala Thr Asp Arg Leu Ile Pro
                290             295             300

Lys Pro Ser Leu Arg Glu Ala Leu Leu Arg Lys Arg Glu Asp Glu Asn
305             310             315             320

Gly Gln Ser

<210> SEQ ID NO 4
<211> LENGTH: 921
<212> TYPE: DNA
<213> ORGANISM: Gluconacetobacter xylinus

<400> SEQUENCE: 4

```
gtggacatgg ataatccaca ggatgtgtcc cgcatgctga cggctggcta cggcctgagc      60 ggggagggggt tccattaccg ttccttccgc tccgtcgtgc gggatatgcc tgtggaggat     120
gccgaagaat ctctccatga agacacgcgc gacgtgcatg cctatgctga agaccagtat     180
gccgaaccgg aaccgcacgt tcccgccgcc gagccggcac cggagcctgt agccccgccg     240
gtcgcagtct cccccgaggc gcccccgtg ccaccaccac ccgcgccgcc accgccagtg      300
gcgccggaag tcgtgcatgt gccccagccc cccgtggccg agaccattgt cccgccgccc     360
ccgcccgccc cgccgccgga aaccgtggtg cggccggctc ccactgcttc ggcgccgggt     420
gtcgtgcagt cgggtgggca ggagcgacgg ggcctgccgc cgtttgccga agcgcctgca     480 gccccgtgc cgccgcgccc ggcaccggcg cagtccgcgc ccttcacggt tgcagccgca      540
gagccggtgg ttaccgcaac agatgactgg gctcctgtac ccaaggcgca gcagcgtcgt     600
gggcagcgcc cgaccggacc tggattcttt tttgccaggg cgggcgaccg gacccagatg     660
ggccggttgt tccaacccac cccggtgccg acagcacagc ctgttctcaa acctgcttcc     720
aaggtgacca cgatgaccaa gctagacaag aattcatgga ataaaagcgc gggacggcag     780
ccggccccga cagacaattc ccgaccctg acggaagtgt tcatgacgct gggtggccgg     840
gccacggatc gtctgatccc caagccaagc ctgcgtgaag ccctgctgcg caagcgtgaa     900
gacgagaatg ggcaatcctg a                                               921
```

<210> SEQ ID NO 5
<211> LENGTH: 359
<212> TYPE: PRT
<213> ORGANISM: Gluconacetobacter xylinus

<400> SEQUENCE: 5

```
Met Leu Leu Asp Phe Met Lys Leu Gln Lys His Val Ser Gly Met Gly
  1               5                  10                  15

Arg Arg Ser Phe Leu Ser Val Met Ala Ala Gly Ser Ile Pro Leu
             20                  25                  30

Ala Ser Ser Ala Glu Ala Gly Asp Gly Thr Ala Val Ser Gln Gln Trp
         35                  40                  45

Ala Ile Phe Arg Ser Lys Tyr Phe His Pro Asp Gly Arg Ile Val Asp
     50                  55                  60

Thr Gly Asn Ser Gly Glu Ser His Ser Glu Gly Gln Gly Tyr Gly Met
 65                  70                  75                  80

Leu Phe Ala Ala Thr Ala Gly Asp Gln Ala Ala Phe Glu Ala Ile Trp
                 85                  90                  95

Val Trp Ala Arg Thr Asn Leu Gln His Lys Thr Asp Ala Leu Phe Ser
            100                 105                 110

Trp Arg Tyr Leu Asp Gly His Asn Pro Pro Val Ala Asp Lys Asn Asn
        115                 120                 125

Ala Thr Asp Gly Asp Leu Leu Ile Ala Leu Gly Leu Ala Arg Ala Gly
    130                 135                 140

Lys Leu Trp Lys Arg Ala Asp Tyr Ile Gln Asp Ala Met Ala Ile Tyr
145                 150                 155                 160

Ala Asp Val Leu Lys Leu Met Thr Met Lys Val Gly Ser Tyr Glu Val
                165                 170                 175

Leu Leu Pro Gly Ala Thr Gly Phe Val Thr Lys Asp Ala Val Thr Leu
            180                 185                 190

Asn Leu Ser Tyr Tyr Val Met Pro Ser Leu Met Gln Ala Phe Glu Leu
        195                 200                 205

Ser Ala Asp Ala Lys Trp Gln Thr Val Met Glu Asn Gly Leu Arg Ile
    210                 215                 220

Ile Ala Lys Gly Arg Phe Gly Glu Trp Lys Leu Pro Pro Asp Trp Leu
225                 230                 235                 240

Ser Ile Asn Arg Gln Thr Gly Ala Phe Ser Ile Ala Lys Gly Trp Ser
                245                 250                 255

Pro Arg Phe Ser Tyr Asp Ala Ile Arg Val Pro Leu Tyr Leu Tyr Trp
            260                 265                 270

Ala His Met Leu Ser Pro Asp Leu Leu Ala Asp Phe Thr Leu Phe Trp
        275                 280                 285

Asn His Phe Gly Ala Ser Ala Leu Pro Gly Trp Val Asp Leu Thr Asn
    290                 295                 300

Gly Ser Arg Ser Pro Tyr Asn Ala Pro Pro Gly Tyr Leu Ala Val Ala
305                 310                 315                 320

Ser Cys Ser Gly Leu Ala Ser Ala Gly Glu Leu Pro Thr Leu Asp His
                325                 330                 335

Ala Pro Asp Tyr Tyr Ser Ala Leu Thr Leu Leu Val Tyr Ile Ala
            340                 345                 350

Arg Ala Glu Gly Gly Gly Met
        355
```

<210> SEQ ID NO 6
<211> LENGTH: 1080
<212> TYPE: DNA
<213> ORGANISM: Gluconacetobacter xylinus

<400> SEQUENCE: 6

```
atgctgttgg attttatgaa gctgcagaaa catgtatccg ggatggggcg tcgctctttt      60
ctgtctgtca tggcggcagc cggcagcatt ccgcttgctt catcggctga ggcagggggac    120
ggcacggcgg tgagccagca atgggccatt ttccgcagca agtatttcca tcccgatggc    180
cgtatcgttg acacaggcaa cagtggcgaa tcccacagcg aggggcaggg ctacggcatg    240
ctgttcgccg ccaccgccgg cgaccaggcg gcgttcgagg cgatatgggt gtgggcgcgc    300
accaatctcc agcacaagac cgacgccctg ttttcgtggc gttacctgga tggacataac    360
ccgccggtcg cggacaaaaa taatgccact gatggcgacc tgctgattgc gcttgggctg    420
gcgcggggccg gcaagctttg gaagcgggct gactatatcc aggatgctat ggccatctac    480
gccgatgtgc tgaagctcat gaccatgaag gtcggctcct atgaggtgct gctgcccggc    540
gcgaccggat tcgtcaccaa ggatgcggtt accctcaacc tttcctatta cgtcatgccc    600
tcgctcatgc aggcgtttga gctgtcggcc gatgcgaagt ggcagaccgt catggaaaat    660
ggcctgcgca ttatcgccaa gggacgattc ggtgaatgga agctgccgcc ggactggctg    720
tcgatcaatc ggcagaccgg cgctttctcc atcgccaagg gctggtcgcc gcgttttttcc    780
tatgatgcga ttcgcgtgcc gctctacctg tactgggcgc atatgctgtc gccggatctc    840
ctggctgact tcacgctttt ctggaaccat ttcgcgcat cggcattgcc gggctgggtt    900
gacctgacga atggctcgcg gtcgccctat aatgcgccac ccggctatct ggccgtcgcg    960
tcgtgttcgg gtctggcgtc ggcagggggaa ctgcccacgc tggatcatgc gccggattat   1020
tattccgcag cacttacatt gctggtctat atcgcccgtg ccgagggagg tgggatgtga   1080
```

<210> SEQ ID NO 7
<211> LENGTH: 341
<212> TYPE: PRT
<213> ORGANISM: Gluconacetobacter xylinus

<400> SEQUENCE: 7

```
Met Thr Leu Pro His Ser Pro Arg Leu Arg Arg Leu Cys Gly Cys
 1               5                  10                  15

Met Ile Ala Thr Ser Leu Ala Leu Ser Ala Gln Gly Gln Ala Asp Ala
            20                  25                  30

Gln Ala Tyr Arg Gly Val Asn Leu Ala Gly Ala Ala Tyr Ser Ser Ser
        35                  40                  45

Arg Leu Pro Gly Arg Tyr Gly Tyr Asp Tyr Leu Tyr Pro Lys Pro Ala
    50                  55                  60

Glu Val Asp Tyr Phe Thr Ala Gln Gly Met Asn Thr Phe Arg Leu Ser
65                  70                  75                  80

Val Leu Trp Glu Arg Leu Gln Pro Thr Leu Asn Gly Pro Leu Asp Glu
                85                  90                  95

Lys Glu Leu Glu Arg Val Arg Gln Phe Ile Ala Tyr Ala Gln Gly Lys
            100                 105                 110

Gly Ala Thr Thr Leu Leu Asp Ile His Asp Tyr Gly Arg Tyr Arg Gly
        115                 120                 125
```

```
Gln Glu Ile Gly Ser Ala Ala Val Pro Asp Thr Ala Phe Ala Asp Leu
130                 135                 140

Trp Ser Arg Leu Ala Gln Ala Leu Gly Asn Asn Pro His Val Leu Phe
145                 150                 155                 160

Gly Leu Met Asn Glu Pro Gln Gln His Ser Ala Glu Ala Trp Lys Asn
                165                 170                 175

Thr Val Gln Ala Ala Ile Asp Ala Ile Arg Lys Ala Gly Ser His Asn
            180                 185                 190

Thr Ile Leu Val Pro Gly Ile Gly Trp Asp Ser Ala Gln Gly Phe Pro
        195                 200                 205

Lys Leu Asn Gly Asp Ala Leu Ala Gln Leu His Asp Pro Asp Asn Arg
210                 215                 220

Leu Val Tyr Glu Val His Glu Tyr Phe Asp Pro Asp Ala Ser Gly Thr
225                 230                 235                 240

Lys Pro Ala Cys Ile Ser Gln Asp Gln Ala Leu Gly Arg Leu Arg Pro
                245                 250                 255

Phe Thr Asp Trp Leu His Ala His Lys Ala His Gly Phe Leu Gly Glu
            260                 265                 270

Phe Gly Val Ser Arg Gln Pro Glu Cys Val Ala Leu Leu Arg Pro Ile
        275                 280                 285

Leu Ser His Leu His Glu Asn Ala Asp Val Trp Asp Gly Trp Thr Tyr
290                 295                 300

Trp Ala Ala Gly Pro Leu Trp Gly Asn Tyr Met Phe Thr Leu Glu Pro
305                 310                 315                 320

Asp His Gly Gln Asp Arg Pro Gln Met Thr Ala Val Lys Pro Phe Leu
                325                 330                 335

Ser Pro Thr Lys Gln
            340

<210> SEQ ID NO 8
<211> LENGTH: 978
<212> TYPE: DNA
<213> ORGANISM: Gluconacetobacter xylinus

<400> SEQUENCE: 8
atgatcgcga cctccctagc actttccgcc caagggcagg cggatgcgca ggcctatcgc      60
ggcgtcaacc ttgcggggggc tgcctattcc tcctccagac tgccgggtcg ttacgggtat    120
gactaccttt accccaagcc cgcggaagtg gattatttca ccgcgcaggg catgaacaca    180
ttccgcctgt cggtattgtg ggaacgcctt cagccaaccc tgaatggccc gctggatgaa    240
aaggaactgg agcgcgtgcg gcagttcatt gcctatcgcg agggcaaggg ggccacaaca    300
ttactcgata tccatgatta cgggcgctat cgcgggcagg aaatcggctc cgcagccgtg    360
ccggatacgg cctttgccga tttatggtcg cggctggcgc aggcactggg caataacccg    420
catgtcctgt tcggcctgat gaacgaaccg cagcagcatt cggccgaggc atggaaaaac    480
acggtacagg ccgcgattga cgccatccgc aaggccggaa gccataatac catcctcgtg    540
cccggcattg gctgggacag cgcgcagggt ttcccgaaac tgaatggcga cgccctggcg    600
caactgcacg atcctgacaa ccgtctggtt tatgaagtgc atgaatattt tgatcccgat    660
gcatcgggca ccaaaccggc atgcatttca aagaccagg cccttggccg gctcaggccc    720
tttaccgact ggctgcacgc ccacaaggcg catggttttcc tgggggaatt cggggtcagc    780
cgccagcccg aatgtgtcgc cctgctcagg cccatcctgt cgcacctgca tgaaaacgcg    840
gatgtctggg atggatggac ctattgggcg gcgggaccac tatggggcaa ttacatgttt    900
```

```
acgcttgaac ctgaccatgg tcaggaccgc ccccagatga cggccgttaa acctttccta       960
agcccgacaa agcaataa                                                     978

<210> SEQ ID NO 9
<211> LENGTH: 118
<212> TYPE: PRT
<213> ORGANISM: Gluconacetobacter xylinus

<400> SEQUENCE: 9

Met Asp Gly Thr Thr Thr Phe Arg Gln Pro Asp Ala Phe Arg Ser
 1               5                  10                  15

Thr Arg Arg Pro Trp Leu Ala Arg Leu Leu Gly Arg Val Pro Pro Pro
            20                  25                  30

Gly Trp Ala Asp Asp Phe Ala Pro Leu Lys Ser Glu Ile Phe Gly Met
        35                  40                  45

Glu Arg Leu Glu Ala His Ala Arg Ser Leu Ala Ala Ala Gln Thr Ile
    50                  55                  60

Val Pro Tyr Gly Arg Gly His Glu Arg Arg Pro Leu Ser Arg Arg
 65                 70                  75                  80

Leu Ala Glu Asn Gly Ala Phe Leu Arg Ala Ala Asp Ile Gln Ile Ala
                85                  90                  95

Gln Asp Ile Gln Asn Gly Lys Gln Leu Thr Pro Ala Ala Gln Trp Leu
            100                 105                 110

Ala Ala Cys Ser Tyr Pro
        115

<210> SEQ ID NO 10
<211> LENGTH: 381
<212> TYPE: DNA
<213> ORGANISM: Gluconacetobacter xylinus

<400> SEQUENCE: 10
atgcgcagga aactggagca gaacatggac gggaccacca ccttccgaca gcccgaccct       60
gcattccggt caacacggcg cccatggctt gcgcgcctgc tggggcgggt gccccccacct     120 ggctgggctg atgacttcgc cccgctgaaa agcgagattt ttggcatgga gcggctggaa     180
gcccatgccc gcagccttgc cgcagcccag accatcgtcc cctacggacg tggccatgaa     240
cgccgcagac cctgtcacg ccggctggcg gaaaacgggg cgttcctgcg cgccgccgac       300
atacagatcg cgcaggatat ccagaacggg aagcagctta cacccgcggc ccagtggctg     360
gcggcttgca gttacccata a                                               381
```

SEPARATOR INCLUDING MICROBIAL CELLULOSE, METHOD OF PRODUCING THE SEPARATOR, AND USE OF THE SEPARATOR

CROSS-REFERENCE TO RELATED APPLICATION

This application claims the benefits of Korean Patent Application No. 10-2015-0073931, filed on May 27, 2015, and Korean Patent Application No. 10-2016-0057815, filed on May 11, 2016 in the Korean Intellectual Property Office, the entire disclosures of which are hereby incorporated by reference.

INCORPORATION-BY-REFERENCE OF MATERIAL SUBMITTED ELECTRONICALLY

Incorporated by reference in its entirety herein is a computer-readable nucleotide/amino acid sequence listing submitted concurrently herewith and identified as follows: One 23,459 Byte ASCII (Text) file named "724437_ST25.TXT," created on May 23, 2016.

BACKGROUND

1. Field

The present disclosure relates to a separator including microbial cellulose, a method of producing the separator, and use thereof.

2. Description of the Related Art

Separators prevent any contact between a positive electrode and a negative electrode in a battery. In view of the increase of the energy density of a battery, dependence on separators has increased in relation to battery safety. In the development of separators for lithium batteries required to have high capacity and high power output, safe separators are needed.

Generally used separators are made of olefin-based polymers such as polyethylene or polypropylene. When the olefin-based polymers are used in lithium batteries for electric vehicles, the lithium batteries may experience a thermal runaway event due to low heat resistance, resulting in breakdown thereof. For this reason, separators having high heat resistance have been developed, and a technique of coating an olefin-based polymer separator with a ceramic material having high heat resistance has been suggested. However, this technique increases the price of separators.

Further, use of lignocelluloses has been studied, but a safety problem occurs since the poor tensile strength of lignocelluloses reduces the durability of a lithium ion battery against external impacts. Accordingly, there is a need for high-strength separators made of cellulose materials and having improved heat resistance.

SUMMARY

Provided herein is a separator including a microbial cellulose nanofiber with a tensile strength of 39 MPa to 290 MPa, a lithium battery including the separator. Also provided is a method for producing the separator comprising culturing a microorganism to obtain a microbial cellulose; and preparing the separator comprising a cellulose nanofiber from the obtained microbial cellulose, wherein the separator has a tensile strength of 39 MPa to 290 MPa.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
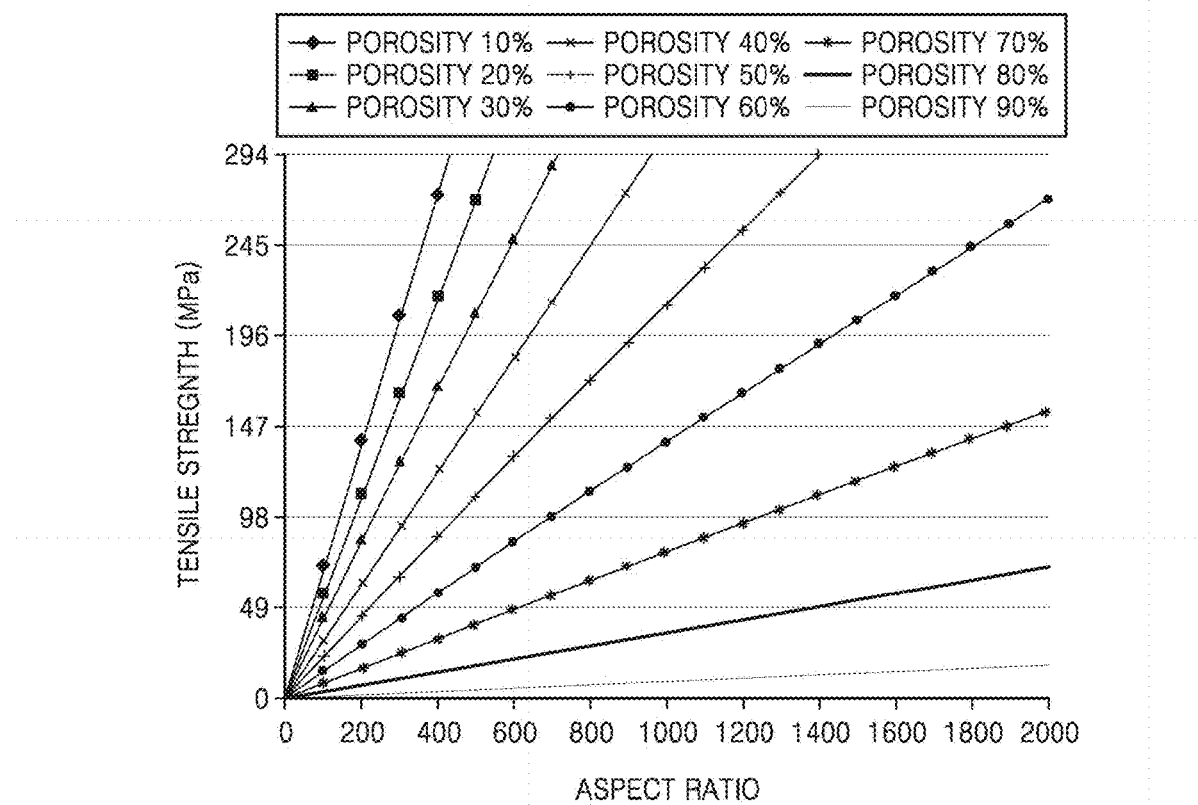
FIG. 1 is a graph of tensile strength plotted against aspect ratio for separators with various porosities having a junction strength of 3.5 MPa.

Provided herein is a separator including a microbial cellulose nanofiber and having a tensile strength of about 39 MPa to about 290 MPa.

A separator is a permeable membrane that can be placed between the positive and negative electrodes of a battery to prevent short circuit contact between the positive electrode and the negative electrode, while allowing transport of ionic charge carriers (ions of an electrolyte). The separator also prevents passage of other materials that may be generated from the positive electrode or negative electrode. The separator may also have an electrolyte-retaining ability. The separator may be a separator for a secondary battery, particularly a lithium secondary battery. The separator is not limited to any particular size or shape, which will be determined by the particular application (battery) in which the separator is used.

The microbial cellulose refers to extracellular cellulose produced by microorganisms such as bacteria. The microbial cellulose may be also referred to as bacterial cellulose or biocellulose.

The microbial cellulose may be a ribbon-like polymer, referred to as cellulose I, or an amorphous polymer, referred to as cellulose II.

The microorganism producing microbial cellulose may produce microbial cellulose by polymerization of glucose into the $\beta$-1,4-glucan chain. The microbial cellulose may be formed by cellulose synthase. The microbial cellulose may be formed in the membrane of the microorganism and secreted along the longitudinal axis of the cell. The microbial cellulose may be a three-dimensional cellulose fiber layer.

The separator may be in the form of a non-woven fabric comprising a cellulose nanofiber from the microbial cellulose. The cellulose nanofiber may have a crosslinked non-woven fabric structure. The separator may have a non-woven fabric structure in which microbial celluloses are chemically linked to each other. The chemical linkage may be a hydrogen bond. The separator may be a non-woven fabric. The separator may be in the shape of sheet such as a membrane or film. The separator may have thickness of about 5 nm to about 100 nm, 5 nm to about 50 nm, 5 nm to about 30 nm, about 10 nm to about 100 nm, about 10 nm to about 80 nm, about 10 nm to about 50 nm, about 10 nm to about 40 nm, or about 10 nm to about 30 nm.

In one embodiment, the microbial cellulose does not include any substantial amount of lignin or hemicelluloses, or is nearly or completely free of such materials. Preferably, the microbial cellulose does not include lignin or hemicelluloses.

The separator including the cellulose nanofiber including the microbial cellulose may have a tensile strength of about 39 MPa to about 290 MPa, such as about 49 MPa to about 290 MPa, or about 54 MPa to about 290 MPa. The tensile strength may be a strength at the time when the separator is torn by applying a force. The tensile strength may be measured by a method known to those skilled in the art. The tensile strength may be measured by, for example, a text analyzer, a universal testing machine, or an injector. The tensile strength may be measured in accordance with ASTM D882.

The microbial cellulose nanofiber may have an aspect ratio of about 200 to about 2,000. The "average aspect ratio" is an "average length/average diameter ratio", which refers to a ratio of an average length of a cellulose nanofiber to an average diameter of the cellulose nanofiber. The average aspect ratio may be 200 to 2000, for example, about 300 or more, about 400 or more, about 450 or more, about 500 or more, or about 550 or more. The average diameter may be an average of the values which are obtained by measuring the diameter of the cellulose nanofiber. The average length may be an average of the values which are obtained by measuring the length of the cellulose nanofiber. The diameter of the cellulose nanofiber may be measured by, for example, scanning electron microscopy (SEM). The diameter of the cellulose nanofiber may be measured by SEM, for example, with 50,000× magnification or higher. The average diameter of the cellulose nanofiber may be about 4 nm to about 100 nm, for example, about 5 nm to about 100 nm, about 6 nm to about 100 nm, about 7 nm to about 100 nm, about 10 nm to about 50 nm, about 10 nm to about 40 nm, about 20 nm to about 50 nm, about 20 nm to about 40 nm, about 4 nm to about 50 nm, about 4 nm to about 40 nm, or about 15 nm to about 50 nm. The length of the cellulose nanofiber may be measured by, for example, Atomic Force Microscopy (AFM).

The weight-average degree of polymerization (DPw) of the microbial cellulose nanofiber may be about 4000 to about 20,000, for example, about 5000 to about 20,000, about 6000 to about 20,000, or about 6100 to about 20,000. Here, the weight-average degree of polymerization may be a weight-average degree of polymerization not of a microbial cellulose nanofiber at the time it is obtained from a microorganism, but a microbial cellulose nanofiber included in the separator. For example, the weight-average degree of polymerization may be obtained after defibration, for example, after passing the microbial cellulose through a microchannel under a pressure. The pressure may be about 10 MPa to about 300 MPa, for example, about 50 MPa to about 300 MPa, about 70 MPa to about 300 MPa, about 100 MPa to about 300 MPa, about 10 MPa to about 200 MPa, about 50 MPa to about 200 MPa, about 70 MPa to about 200 MPa, or about 100 MPa to about 200 MPa. The microchannel may have a diameter of about 1 um to about 1000 um, for example, about 1 um to about 500 um, about 1 um to about 300 um, about 1 um to about 100 um, about 1 um to about 50 um, about 1 um to about 30 um, or about 1 um to about 20 um. The microchannel may have a length of about 1 um to about 1000 um, for example, about 10 um to about 1000 um, about 50 um to about 1000 um, about 50 um to about 500 um, about 50 um to about 300 um, about 1 um to about 500 um, or about 1 um to about 300 um. The length of the microchannel may be about 1.5 times or longer, about 2 times or longer, or about 3 times or longer than the diameter thereof. The passing may be performed once or more times, for example, about once to about twenty times, about once to about ten times, about once to about seven times, about once to about six times, about twice to about ten times, or about three times to about ten times.

The separator may have porosity of about 30 to 80%, for example, about 30% to about 70%, about 30% to about 60%, about 45% to about 90%, about 50 to about 80%, or about 60 to about 70% (void volume based on the total volume of the separator. The separator may have the largest pore of about 1.0 μm or smaller, for example, about 0.5 μm or smaller, about 0.1 to about 1.0 μm, or about 0.1 to about 0.5 μm.

The porosity of the separator may be determined by controlling the amount of a pore forming agent used in manufacturing the separator. The pore forming agent may be, for example, one or more selected from polyethylene glycol (PEG), polypropylene alcohol, polypropylene, and hydroxy cellulose. Further, pores may be formed in the separator by dispersing the separator in a solvent. The solvent may be an organic solvent or water. The organic solvent may be alcohol such as ethyl alcohol. Further, the separator and the pore forming agent are dispersed in the solvent to form pores in the separator.

The separator may have air permeability of about 50 sec/100 cc to about 3000 sec/100 cc, for example, about 50 sec/100 cc to about 1000 sec/100 cc, about 50 sec/100 cc to about 2000 sec/100 cc, about 100 sec/100 cc to about 2000 sec/100 cc, about 200 sec/100 cc to about 2000 sec/100 cc, about 300 sec/100 cc to about 2000 sec/100 cc, about 100 sec/100 cc to about 1000 sec/100 cc, to about 100 sec/100 cc to about 500 sec/100 cc. The air permeability may be determined by a method known to those skilled in the art, for example, ASTM D726 or permeability test method.

The microbial cellulose separator may further include a crosslinking agent. The crosslinking agent may be a component that helps linkage between microbial celluloses. The crosslinking agent may be added in an amount of about 1 to 50 parts by weight, based on 100 parts by weight of the microbial cellulose. For example, the crosslinking agent may be added in an amount of about 1 to 30 parts by weight, about 1 to 20 parts by weight, or about 1 to 15 parts by weight, based on 100 parts by weight of the microbial cellulose. The crosslinking agent may be one or more selected from the group consisting of isocyanate, polyvinyl alcohol, and polyamide epichlorohydrin (PAE).

The separator may further include a binder. The binder used in the separator may be a component that assists binding between the cellulose nanofibers. The binder may be added in an amount of about 1 to 50 parts by weight, based on 100 parts by weight of microbial cellulose. For example, the binder may be added in an amount of about 1 to 30 parts by weight, about 1 to 20 parts by weight, or about 1 to 15 parts by weight, based on 100 parts by weight of microbial cellulose. The binder may be one or more selected from cellulose single nanofiber, methyl cellulose, hydroxypropyl methyl cellulose, hydroxyethyl methyl cellulose, carboxyl methyl cellulose, or ethyl cellulose, polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, and polyvinylalcohol.

The microbial cellulose may be derived from the genus *Enterobacter, Gluconacetobacter, Acetobacter, Achromobacter, Agrobacterium, Alcaligenes, Azotobacter, Pseudomonas, Rhizobium, Sarcina, Klebsiella,* or *Escheri-*

*chia*. The microorganism belonging to the genus *Acetobacter* may be *Actetobacter pasteurianus*. The microorganism belonging to the genus *Agrobacterium* may be *Agrobacterium tumefaciens*. The microorganism belonging to the genus *Rhizobium* may be *Rhizobium leguminosarum*. The microorganism belonging to the genus *Sarcina* may be *Sarcina ventriculi*. The microorganism belonging to the genus *Gluconacetobacter* may be *Gluconacetobacter xylinum*. The microorganism belonging to the genus *Klebsiella* may be *Klebsiella pneumoniae*. The microorganism belonging to the genus *Escherichia* may be *E. coli*.

The microorganism may be a non-natural microorganism. The non-natural microorganism refers to a microorganism having one or more genetic modifications that are not generally found in the wild-type strain of the referenced microorganism. The non-natural microorganism may be a genetically engineered microorganism. The non-natural microorganism may be a strain including metabolic engineering. The metabolic engineering may include metabolic pathway engineering. The metabolic pathway engineering may include metabolic pathway alteration.

The term "parent strain" or "parent cell" may be used to indicate a subject genetic modification. Since the parent cell may be identical to a subject cell, except the genetic modification, the parent cell may be a reference cell with respect to the genetic modification. The term "genetic modification" means an artificial alteration of a constitution or structure of a genetic material of a cell. The parent cell may be a cell that does not have a corresponding genetic modification, for example, a genetic modification of increasing the activity of cellulose synthase. The genetic modification includes a modification of introducing a polynucleotide encoding a polypeptide, or substitution, addition, insertion, or deletion of one or nucleotides in a genetic material of a parent cell, or a chemical mutation of a genetic material of a parent cell. The genetic modification also includes modifications in non-coding regulatory regions that are capable of modifying expression of a gene or an operon, in which the non-coding regions include a 5'-non coding sequence and/or a 3'-non coding sequence.

The term "wild-type" polypeptide or polynucleotide may be a polypeptide or polynucleotide having no particular genetic modification, and the genetic modification is to obtain a genetically engineered polypeptide or polynucleotide.

The term "increase in substrate specificity", or "increase in activity" may refer to a substrate specificity level or an activity level that is higher than that of a comparative polypeptide of the same type that does not have a given genetic modification.

The term "increase in activity" or "increased activity", as used herein, may refer to a detectable increase in an activity of a cell, a protein, or an enzyme. The "increase in activity" or "increased activity" may also refer to an activity level of a modified (e.g., genetically engineered) cell, protein, or enzyme that is higher than that of a comparative cell, protein, or enzyme of the same type, such as a cell, protein, or enzyme that does not have a given genetic modification (e.g., original or "wild-type" cell, protein, or enzyme). The "cell activity" may refer to an activity of a particular protein or enzyme of a cell. For example, an activity of a modified or engineered cell, protein, or enzyme may be increased by about 5% or more, about 10% or more, about 15% or more, about 20% or more, about 30% or more, about 50% or more, about 60% or more, or about 100% or more than an activity of a non-engineered cell, protein, or enzyme of the same type, i.e., a wild-type cell, protein, or enzyme. An activity of a particular protein or enzyme in a cell may be increased by about 5% or more, about 10% or more, about 15% or more, about 20% or more, about 30% or more, about 50% or more, about 60% or more, about 70% or more, or about 100% or more than an activity of the same protein or enzyme in a parent cell, e.g., a non-engineered cell. A cell having an increased activity of a protein or an enzyme may be identified by using any method known in the art. The cell having the increased activity may have one or more genetic modifications of increasing the activity of the enzyme or polypeptide, compared to a cell having no genetic modification.

The term "decrease in activity" or "decreased activity", as used herein, means that a cell has an activity of an enzyme or a polypeptide being lower than that measured in a parent cell (e.g., a non-genetically engineered cell). Also, the "decrease in activity" or "decreased activity" means that an isolated enzyme or a polypeptide has an activity being lower than that of an original or a wild-type enzyme or polypeptide. The decrease in activity or decreased activity encompasses no activity. For example, a modified (e.g., genetically engineered) cell or enzyme has enzymatic activity of converting a substrate to a product, which shows about 20% or more, about 30% or more, about 40% or more, about 50% or more, about 55% or more, about 60% or more, about 70% or more, about 75% or more, about 80% or more, about 85% or more, about 90% or more, about 95% or more, or about 100% decrease, compared to that of a cell or enzyme that does not have the modification, i.e., a parent cell or a "wild-type" cell or enzyme. Decreased activity of an enzyme or a cell may be confirmed by any methods known in the art. The decrease in activity includes the case that an enzyme has no activity or decreased activity even though the enzyme is expressed, or the case that an enzyme-encoding gene is not expressed or expressed at a low level, compared to a cell having a non-modified gene, i.e., a parent cell or a wild-type cell. The cell having the decreased activity may have one or more genetic modifications of decreasing the activity of the enzyme or polypeptide, compared to a cell having no genetic modification.

The non-natural microorganism may have an increase in substrate specificity for glucose and/or an increase in cellulose synthase activity, compared to its parent cell. Cellulose synthase is an enzyme that may catalyze the following reaction: UDP-glucose+(1,4-beta-D-glucosyl)$_n$↔H UDP+ (1,4-beta-D-glucosyl)$_{n+1}$.

In this reaction, glucosyl may be glucosyl of glucose, and (1,4-beta-D-glucosyl)$_{n+1}$ is an extended chain of the glucosyl residue, which represents cellulose. The cellulose synthase may be an enzyme classified as EC 2.4.1.12. The cellulose synthase may be derived from *Gluconacetobacter xylinus*. The cellulose synthase may have an amino acid sequence of SEQ ID NO: 1. A gene encoding the cellulose synthase may have a polynucleotide sequence of SEQ ID NO: 2. The cellulose synthase may be cyclic bis-(3',5') diguanylic acid (cyclic-di-GMP)-independent. The cellulose synthase may not bind with cyclic-di-GMP.

The microorganism (strain) producing microbial cellulose may be a recombinant or non-natural microorganism having a modified cellulase activity, compared to its parent cell. Further, the strain may have an increased cellulase activity, compared to its parent cell.

The cellulase may be one or more selected from endocellulase, exocellulase, cellobiase, oxidative cellulase, cellulose phosphorylase, endoglucanase, and cellobiose phophorylase. The endocellulase may be an enzyme classified as EC 3.2.1.4. The exocellulase may be an enzyme classified as EC 3.2.1.91. The cellobiase may be an enzyme classified as EC 3.2.1.21. The endoglucanase may be endo-1,4-beta-glucanase. The endo-1,4-beta-glucanase may be an enzyme classified as EC 3.2.1.6. The cellobiose phophorylase may be an enzyme classified as EC 2.4.1.20. The cellobiose phophorylase may catalyze the following reaction: cellobiose+phosphate alpha-D-glucose 1-phosphate+D-glucose. The endocellulase may have an amino acid sequence of SEQ ID NO: 3. A gene encoding the endocellulase may have a polynucleotide sequence of SEQ ID NO: 4. The endo-1,4-beta-glucanase may have an amino acid sequence of SEQ ID NO: 5 or 7. A gene encoding the endo-1,4-beta-glucanase may have a polynucleotide sequence of SEQ ID NO: 6 or 8. The cellobiose phophorylase may have an amino acid sequence of SEQ ID NO: 9. A gene encoding the cellobiose phophorylase may have a polynucleotide sequence of SEQ ID NO: 10.

The non-natural microorganism may have a degree of cellulose polymerization, which shows about 5% to 100%, about 10% to 100%, about 15% to 100%, about 20% to 100%, about 25% to 100%, about 30% to 100%, about 35% to 100%, about 45% to 100%, or about 50% to 100% increase, compared to its parent strain.

Another aspect provides a method of producing a separator, which method includes culturing the microorganism to obtain microbial cellulose; and preparing the separator including a cellulose nanofiber including the obtained microbial cellulose and having a tensile strength of about 39 MPa to about 290 MPa.

The method of producing the separator may include culturing the microorganism to obtain microbial cellulose. The microbial cellulose can be obtained from the culture by separating a cellulose pellicle which is formed on a top layer of the culture.

The obtaining of microbial cellulose may also include combining the obtained microbial cellulose (e.g., pellicle) with a base (e.g., sodium hydroxide or the like). The base may be provided to remove microorganisms from the isolated cellulose. The base may be sodium hydroxide. The concentration of sodium hydroxide may be about 0.1 N.

The culturing may be performed under suitable conditions for the microorganism used. Such culture conditions may include, for example, a carbon source, a nitrogen source, or an oxygen condition utilized by the microorganism. The carbon source may include monosaccharides, disaccharides, or polysaccharides. The carbon source may be glucose, fructose, sucrose, mannitol, mannose, maltose, lactose, xylose, glycerol, sorbitol, cellobiose, ethanol, or galactose. The nitrogen source that can be utilized by the microorganism may be an organic nitrogen compound or an inorganic nitrogen compound. The nitrogen source may be exemplified by amino acids, amides, amines, nitrates, or ammonium salts. The medium used for culturing the microorganism may be any general medium that is suitable for host cell growth, such as a minimal or complex medium containing proper supplements. The suitable medium may be commercially available or prepared by a known preparation method. The medium used for culturing may be a medium that satisfies requirements of the microorganism. The medium may be a medium selected from the group consisting of a carbon source, a nitrogen source, a salt, trace elements and combinations thereof.

The culturing may be performed under aerobic conditions. The culture temperature may be about 25 to 30° C. pH of the culture medium may be about 4 to about 7. The culturing may be performed by static culture or under stirring.

The preparing of the separator including the cellulose nanofiber may include nano-fibrillation and/or defibration of the obtained microbial cellulose. The defibration may include separating of cellulose structures condensed by reactions between cellulose nanofibers into respective cellulose nanofibers, or increasing of the distance between the cellulose nanofibers, and can be performed mechanically and/or chemically. The defibration may include, for example, passing the microbial cellulose through a microchannel while applying a pressure thereto. The pressure may be about 10 MPa to about 300 MPa, for example, about 50 MPa to about 300 MPa, about 70 MPa to about 300 MPa, about 100 MPa to about 300 MPa, about 10 MPa to about 200 MPa, about 50 MPa to about 200 MPa, about 70 MPa to about 200 MPa, or about 100 MPa to about 200 MPa. The microchannel may have a diameter of about 1 um to about 1000 um, for example, about 1 um to about 500 um, about 1 um to about 300 um, about 1 um to about 100 um, about 1 um to about 50 um, about 1 um to about 30 um, or about 1 um to about 20 um. The microchannel may have a length of about 1 um to about 1000 um, for example, about 10 um to about 1000 um, about 50 um to about 1000 um, about 50 um to about 500 um, about 50 um to about 300 um, about 1 um to about 500 um, or about 1 um to about 300 um. The length of the microchannel may be about 1.5 times or longer, about 2 times or longer, or about 3 times or longer than the diameter thereof. The passing may be performed once or more times, several times, for example, about once to about twenty times, about once to about ten times, about once to about seven times, or about once to about six times. The defibration may be passing of the cellulose nanofiber under a pressure of about 10 MPa to about 300 MPa through the microchannel having a diameter of about 1 um to 100 um, a length of about 1 um to 1000 um, and a ratio of length to diameter of about 1.5 or more, for example, about 1.5 to about 1000, about 5 to about 1000, about 10 to about 1000, about 1.5 to about 500, or about 1 to about 100, once or more times, for example, about once to about ten times.

The defibrating may include homogenization of the obtained microbial cellulose, and the homogenization may include homogenizing using a homogenizer (e.g., microchannel homogenizer).

Alternatively, or in addition, chemical defibration can be used. The chemical defibration may include oxidation of OH to —COOH in the cellulose nanofiber. A negative charge produced from —COOH by the oxidation may increase the distance between the cellulose nanofibers. In the oxidation of OH to —COOH, a proper oxidant, for example, TEMPO, etc. may be used.

The preparing the separator may include combining cellulose nanofibers, a pore forming agent, and a suitable solvent to obtain a cellulose nanofibers solution and forming a sheet from the cellulose nanofibers solution. The cellulose nanofibers may be fibrillated/defibrated cellulose nanofibers obtained by method described above. The pore forming agent may be polyalkylene ether such polyethylene glycol (PEG), silica or like. The solvent may be any liquid material capable of dispersing the cellulose nanofibe, for example, water, organic solvent, or mixture of water and organic solvent. The organic solvent may be alcohol. The alcohol may be C1-C6 such as isopropyl alcohol. The combining may performed by mixing with stirring. The solution may a homogeneous dispersion of fibrillated/defibrated cellulose nanofibers. Forming a sheet may include depositing the solution on a substate and drying the solution. Forming a sheet may include pressing the solution or dyed solution. The preparing the separator may include forming pores by removing the pore forming agent. The pore forming agent may be removed by solubilizing it in a solvent such as toluene.

Still another aspect provides a battery, especially a secondary battery, including the above-described separator. A structure of the battery is not particularly limited, but the separator may be used in all kinds of battery such as a prismatic type, a cylindrical type, a pouch-type, a coin-type, etc. Further, an active material used in the positive electrode and the negative electrode is not particularly limited. For example, the secondary battery may be a lithium battery using lithium as the active material. The secondary battery may include the positive electrode, the negative electrode, the electrolyte, and the separator between the positive electrode and the negative electrode. The electrolyte may be included in a positive electrode chamber, of which at least part is defined by the positive electrode and the separator, and a negative electrode chamber, of which at least part is defined by the negative electrode and the separator.

Still another aspect provides a lithium battery including the positive electrode; the negative electrode; the electrolyte; and the separator including the microbial cellulose nanofiber and having a tensile strength of about 39 MPa to about 290 MPa.

The lithium battery may be a lithium ion battery. The lithium battery may have a positive electrode, an electrode, and an electrolyte disposed between the positive electrode and electrode.

The separator may be a single-layer separator. The separator is the same as described above.

The positive electrode may include a positive electrode active material. The positive electrode active material may be a material which can reversibly intercalate and deintercalate lithium ions. The positive electrode active material may be, for example, a compound represented by any one chemical formula of $Li_aA_{1-b}B_bD_2$ (wherein $0.90 \le a \le 1$, and $0 \le b \le 0.5$); $Li_aE_{1-b}B_bO_{2-c}D_c$ (wherein $0.90 \le a \le 1$, $0 \le b \le 0.5$, $0 \le c \le 0.05$); $LiE_{2-b}B_bO_{4-c}D_c$ (wherein $0 \le b \le 0.5$, $0 \le c \le 0.05$); $Li_aN_{1-b-c}Co_bB_cD_\alpha$ (wherein $0.90 \le a \le 1$, $0 \le b \le 0.5$, $0 \le c \le 0.05$, $0 < \alpha \le 2$); $Li_aNi_{1-b-c}Co_bB_cO_{2-\alpha}F_\alpha$ (wherein $0.90 \le a \le 1$, $0 \le b \le 0.5$, $0 \le c \le 0.05$, $0 < \alpha < 2$); $Li_aNi_{1-b-c}Co_bB_cO_{2-\alpha}F_2$ (wherein $0.90 \le a \le 1$, $0 \le b \le 0.5$, $0 \le c \le 0.05$, $0 < \alpha < 2$); $Li_aNi_{1-b-c}Mn_bB_cD_\alpha$ (wherein $0.90 \le a \le 1$, $0 \le b \le 0.5$, $0 \le c \le 0.05$, $0 < \alpha \le 2$); $Li_aNi_{1-b-c}Mn_bB_cO_{2-\alpha}F_\alpha$ (wherein $0.90 \le a \le 1$, $0 \le b \le 0.5$, $0 \le c \le 0.05$, $0 < \alpha < 2$); $Li_aNi_{1-b-c}Mn_bB_cO_{2-\alpha}F_2$ (wherein $0.90 \le a \le 1$, $0 \le b \le 0.5$, $0 \le c \le 0.05$, $0 < \alpha < 2$); $Li_aNi_bE_cG_dO_2$ (wherein $0.90 \le a \le 1$, $0 \le b \le 0.9$, $0 \le c \le 0.5$, $0.001 \le d \le 0.1$); $Li_aNi_bCo_cMn_dG_eO_2$ (wherein $0.90 \le a \le 1$, $0 \le b \le 0.9$, $0 \le c \le 0.5$, $0 \le d \le 0.5$, $0.001 \le e \le 0.1$); $Li_aNiG_bO_2$ (wherein $0.90 \le a \le 1$, $0.001 \le b \le 0.1$); $Li_aCoG_bO_2$ (wherein $0.90 \le a \le 1$, $0.001 \le b \le 0.1$); $Li_aMnG_bO_2$ (wherein $0.90 \le a \le 1$, $0.001 \le b \le 0.1$); $Li_aMn_2G_bO_4$ (wherein $0.90 \le a \le 1$, $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(2-f)}Fe_2(PO_4)_3$ ($0 \le f \le 2$); and $LiFePO_4$.

In the above chemical formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; J is V, Cr, Mn, Co, Ni, Cu, or a combination thereof.

The positive electrode active material may be, for example, lithium cobalt oxide (LCO), lithium nickel oxide, lithium nickel cobalt oxide, lithium nickel manganese oxide, lithium nickel cobalt aluminum oxide (hereinafter, referred to as "NCA"), lithium nickel cobalt manganese oxide (hereinafter, referred to as "NCM"), lithium manganese oxide, lithium iron phosphate, nickel sulfide, copper sulfide, sulfur, iron oxide, or vanadium oxide. These positive electrode active materials may be used alone or in combination of two or more thereof.

The positive electrode may further include additives, for example, a conductive agent, a binder, an electrolyte, a filler, a dispersing agent, or an ion conductive agent, in addition to the positive electrode active material.

The conductive agent may provide a conductive path for the positive electrode active material. The conductive agent may be, for example, carbonaceous materials such as graphite, carbon black, acetylene black, ketjen black, and carbon fiber; metal-based materials such as copper, nickel, aluminum, or silver in a powder form or a fiber form; conductive polymers such as polyphenylene derivatives, or mixtures thereof. A weight ratio of the positive electrode active material and the conductive agent may be in the range of 99:1 to 90:10.

The binder may be, for example, polytetrafluoroethylene, polyvinylidene fluoride, or polyethylene. The binder may be used alone or in combination.

The filler, dispersing agent or ion conductive agent may be a material which is known to be used in the electrodes of secondary lithium batteries.

The negative electrode may include a negative electrode active material.

The negative electrode active material may be a material capable of forming an alloy with lithium, or a material which can reversibly intercalate and deintercalate lithium ions. The negative electrode active material may be, for example, a metal such as lithium, indium, tin, aluminum, or silicon, and an alloy thereof; a transition metal oxide such as $Li_{4/3}Ti_{5/3}O_4$, SnO; non-transition metal oxide; or a carbonaceous material such as artificial graphite, graphite carbon fiber, resin-baked carbon, pyrolytic vapor grown carbon, cokes, mesocarbon microbead (MCMB), furfuryl alcohol resin based carbon, polyacene, pitch-based carbon fiber, vapor grown carbon fiber, natural graphite, and non-graphitizable carbon. These negative electrode active materials may be used alone or in combination of two or more thereof.

The metal alloyable with lithium may be, for example, Si, Sn, Al, Ge, Pb, Bi, Sb, Si—Y alloy (wherein Y is an alkaline metal, an alkaline earth metal, a Group 13 element, a Group 14 element, a transition metal, a rare earth element, or combinations thereof (except for Si)), Sn—Y alloy (wherein Y is an alkaline metal, an alkaline earth metal, a Group 13 element, a Group 14 element, a transition metal, a rare earth element, or combinations thereof (except for Sn)). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. The transition metal oxide may be, for example, lithium titanium oxide, vanadium oxide, or lithium vanadium oxide. The non-transition metal oxide may be, for example, $SnO_2$ or $SiO_x$ ($0 < x < 2$). The carbonaceous materials may be, for example, crystalline carbon, amorphous carbon, or a mixture thereof. The crystalline carbon may be, for example, natural graphite or artificial graphite that is in amorphous, plate, flake, spherical, or fibrous form. The amorphous carbon may be, for example, soft carbon, hard carbon, meso-phase pitch carbides, or sintered cokes.

The negative electrode may further include additives, for example, a conductive agent, a binder, an electrolyte, a filler, a dispersing agent, or an ion conductive agent, in addition to the negative electrode active material. Specific examples thereof are the same as those in the above described positive electrode.

In addition, the positive electrode active material and the negative electrode active material may further include a plasticizer. The plasticizer may form pores inside the electrode plates.

The electrolyte may be, for example, a liquid electrolyte. The liquid electrolyte may be an organic liquid electrolyte. The organic liquid electrolyte may be prepared by dissolving lithium salts in an organic solvent.

The organic solvent may be any solvent commonly used in the art. Examples thereof include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may be any lithium salt commonly used in the art. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (Here, x and y are natural number), LiCl, LiI, and mixtures thereof.

If necessary, the electrolyte may be a gel or solid electrolyte as well as a liquid electrolyte. Examples of the solid electrolyte may include boron oxide and lithium oxynitride, but are not limited thereto. In addition, any solid electrolyte commonly used in the art may be also used. The gel or solid electrolyte may be formed on the negative electrode by sputtering.

The lithium battery may be used as a power source for small-sized devices and also used as a unit battery of a middle- or large-sized battery module having a plurality of battery cells. The middle- or large-sized device may be, for example, a power tool; xEV including an electric vehicle (EV), a hybrid electric vehicle (HEV) and a plug-in hybrid electric vehicle (PHEV); an electric two-wheeled vehicle including E-bike and E-scooter; an electric golf cart; an electric truck; an electric commercial vehicle; or an electric storage system. Further, the lithium battery may be suitable for any use, in which high-power output, high voltage and operation under high temperature conditions are required. The lithium battery may be used in an electric vehicle (EV). The electric vehicle may be, for example, a hybrid vehicle such as plug-in hybrid electric vehicle (PHEV).

The separator according to an aspect may provide a separator having a high tensile strength.

The method of producing the separator according to an aspect may provide a separator having a high tensile strength.

The lithium battery according to an aspect may provide a separator having heat resistance.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items.

Hereinafter, the present invention will be described in more detail with reference to the exemplary embodiments. However, the exemplary embodiments described herein should be considered in a descriptive sense only and not for purposes of limitation.

Example 1: Production of Microbial Cellulose and Manufacture of Separator Including Microbial Cellulose 1. Production of Microbial Cellulose A wild-type strain, *Gluconacetobacter xylinum* was transferred to 100 ml of Hestrin-Schramm (HS) medium in a 250-ml flask, followed by static culture at 30° C. for 48 hours. The HS medium included 20 g/L of glucose, 5 g/L of bacto-peptone, 5 g/L of yeast extract, 2.7 g/L of $Na_2HPO_4$, and 1.15 g/L of citric acid in water.

The resulting cellulose pellicle was harvested and washed with distilled water three times, followed by heating with a 2% NaOH aqueous solution at 121° C. for 15 minutes. Cells and impurities present in the cellulose pellicle were hydrolysed, followed by washing with distilled water. Thus, a purified cellulose pellicle was obtained. The purified cellulose pellicle was cut in a proper size, and then mixed with water, and pre-homogenized using a general homogenizer (DAIHAN Scientific, Homogenizer HG-15A, Korea) to prepare 500 mL of 0.5 wt % cellulose suspension.

2. Defibration of Microbial Cellulose

The cellulose pellicle suspension obtained in Section 1 was passed through a microchannel (Interaction chamber, length of 200 um) of a high pressure homogenizer, Nano Disperser (IIshin autoclave, ISA-NH500, Korea) under 150 MPa 10 times to obtain a slurry-type cellulose nanofiber suspension. The pressure after passing through the microchannel becomes lower than the internal pressure of the microchannel, because a space before and after the microchannel is wider than the microchannel. The cellulose nanofiber suspension passed through the microchannel was centrifuged to remove water, and a concentrated cellulose nanofiber suspension was finally obtained.

3. Oxidation of Cellulose Nanofiber

The cellulose nanofiber obtained in Section 2 was oxidized using 2,2,6,6-tetramethylpiperidine-1-oxyl radical (TEMPO) to increase degree of dispersion. The oxidation procedure was performed according to a method described in Saito et al., *Biomacromolecules*, 2007, 8(8), pp. 2485-24791. In detail, cellulose nanofiber (1 g) was suspended in 100 mL of water containing TEMPO (0.016 g, 0.1 mmol) and NaBr (0.1 g, 1 mmol). A 12% NaClO solution (pH 10) was added to the nanofiber dispersion at a concentration of 5.0 mmol per gram of cellulose nanofiber, and reaction was allowed at room temperature for 3 hours under stirring at 500 rpm. During the reaction, 0.5 M NaOH was added to maintain pH 10.0, and the reaction was terminated when there was no further change in pH. The obtained mixture was washed with centrifugation and water three times to five times. As a result, TEMPO-oxidized cellulose, namely, a cellulose nanofiber dispersion having high degree of dispersion, of which surface was introduced with —COONa groups, was obtained.

4. Physical Properties of Defibrillated Cellulose Nanofiber Having High Degree of Dispersion Physical properties of the cellulose nanofiber (CNF) obtained in Section 3 were measured.

(1) Diameter and Aspect Ratio of Cellulose Nanofiber

With regard to the diameter of the cellulose nanofiber, several images of a properly diluted CNF solution were obtained by Atomic Force Microscopy (AFM, Veeco, Dimension V model), and analyzed by an image analyzer to measure diameters and lengths of 100 cellulose fibers. An average diameter and an average length were calculated.

(2) Weight Average Degree of Polymerization of Cellulose Nanofiber

Degree of polymerization (DP) of CNF was calculated as degree of polymerization determined by viscosity measurement (DPv) and weight average degree of polymerization (DPw).

With regard to DPw, 5 mg of freeze-dried CNF was taken and 10 ml of pyridine and 1 ml of phenyl isocyanate were added to a 12-ml vial, and derivatization reaction was allowed at 100° C. for 48 hours. 2 ml of methanol was added to the sample, followed by washing with 100 ml of 70% methanol twice and 50 ml of $H_2O$ twice. Gel permeation chromatography (GPC) was used to determine a molecular weight, a molecular weight distribution, and a length distribution of CNF. The GPC experiment was performed on a Waters Allinace e2695 separation module (Milford, Mass., USA) equipped with a Waters 2414 refractive index detector and three columns, that is, Styragel HR2, HR4, and HMW7 columns. Chloroform as an eluent was used at a flow rate of 1.0 mL/min. A concentration of the sample was 1 mg/mL, and an injection volume thereof was 20 ul. Polystyrene (PS, #140) standards were used to calibrate the curve.

The used samples were cellulose nanofiber (hereinafter, also referred to as "M") obtained in Section 3 and FMa (Sugino Ltd., FMa-10002), WMa (Sugino Ltd., Wma-1002), and IMa (Sugino Ltd., IMa-10002) as commercial lignocelluloses. Table 1 shows the diameter and DPw of bacterial cellulose and lignocellulosic nanofibers.

TABLE 1

| No. | Name | Diameter (nm) | DPw(Da) |
|---|---|---|---|
| 1 | FMa | 39.2 ± 55.5 | 360 |
| 2 | WMa | 26.2 ± 16.5 | 1792 |
| 3 | IMa | 39.1 ± 48.4 | 2339 |
| 4 | M | 38.0 ± 40.0 | 6201 |

As shown in Table 1, DPw of bacterial cellulose nanofiber was much higher than those of the lignocellulosic nanofibers.

Example 2: Test of Properties of Separator Including Microbial Cellulose

The cellulose nanofiber prepared in Section 3 of Example 1 was used to manufacture a separator and to measure physical properties thereof.

1. Manufacture of Separator 0.423 g of a pore forming agent, polyethylene glycol (PEG, number average molecular weight: 6,000) was added to 30 ml of the cellulose nanofiber dispersion obtained by Section 3 of Example 1, which was diluted with water at a concentration of 0.5 wt %, followed by stirring at room temperature and 1000 rpm for 1 hour. 13.8 g of the dispersion thus obtained was poured in a Petri dish having a diameter of 50 cm, and dried at 90° C. for 2 hours. A cellulose nanofiber film (hereinafter, referred to as "non-woven fabric") formed on the Petri dish was immersed by addition of toluene, and washed with four times to five times to prepare a PEG-removed non-woven fabric, which was dried at room temperature for 3 to 4 hours.

The dried non-woven fabric was pressed by using a hot press (Carver Inc., Model 12-12H) with a force of 5 ton (5 MPa) for 10 minutes to manufacture a separator in the form of a pressed non-woven fabric (hereinafter, referred to as "M1").

Further, a separator (hereinafter, referred to as "M2") was manufactured in the same manner as above, except that 0.3 g/g of a cellulose single nanofiber CNF (Daiichi kogyou seiyaku, Rheocrysta) as a binder was added to the cellulose nanofiber dispersion, together with PEG.

2. Physical Properties of Separator (1) Test of Tensile Strength

The separator obtained in Section 1 was prepared in a size of 15 mm×50 mm and stretched using a texture analyzer (TA.XT plus, Stable Micro Systems) at 5 mm/min to determine tensile strength as stress at break. Table 2 shows tensile strength of the separator manufactured by using the cellulose nanofiber.

TABLE 2

| No. | Name | Tensile strength (MPa) |
|---|---|---|
| 1 | FMa | not manufacturable |
| 2 | WMa | 20.4 |
| 3 | IMa | 25.9 |
| 4 | M1 | 54.6 |

As shown in Table 2, tensile strength of the separator manufactured from the bacterial cellulose nanofiber was much higher than those of the separators manufactured from the lignocellulosic nanofibers. Considering DPw of Table 1, as DPw was higher, tensile strength was more excellent. Meanwhile, tensile strength of M2 separator was 78.5 MPa.

To examine a relationship between the aspect ratio of the cellulose nanofiber and the tensile strength of the separator manufactured therefrom, simulation of the tensile strength of the separator according to the aspect ratio was performed. A diameter of the cellulose nanofiber used in the simulation was 38 nm, a thickness of the separator was 20 um, and a junction strength which is a strength at a junction of a cellulose nanofiber and a cellulose nanofiber was regarded as 3.5 MPa (FIG. 1) and 4.6 MPa (FIG. 2), and an aspect ratio and a tensile strength according to different porosities were predicted (Japanese Patent Publication No. 2003-247198).

Figure 2:
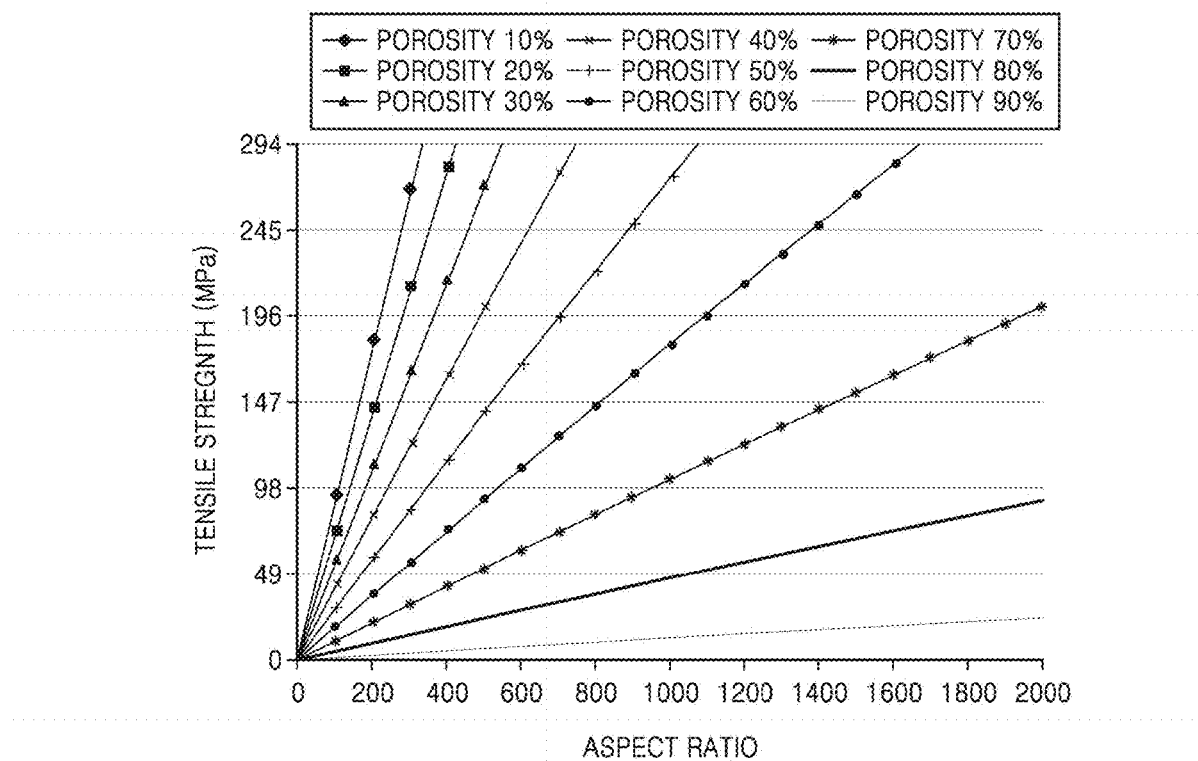
FIG. 2 is a graph of tensile strength plotted against aspect ratio for separators with various porosities having a junction strength of 4.6 MPa.

FIGS. 1 and 2 show the tensile strength of the separator. As shown in FIGS. 1 and 2, as the aspect ratio increased, tensile strength increased.

Further, to examine a relationship between DPw of the cellulose nanofiber and the tensile strength of the separator manufactured therefrom, simulation of the tensile strength of the separator according to DPw was performed. A diameter of the cellulose nanofiber used in the simulation was 38 nm, a thickness of the separator was 20 um, and a junction strength which is a strength at a junction of a cellulose nanofiber and a cellulose nanofiber was regarded as 10.2 MPa, and DPw and a tensile strength according to different porosities were predicted (Japanese Patent Publication No. 2003-247198).

Figure 3:
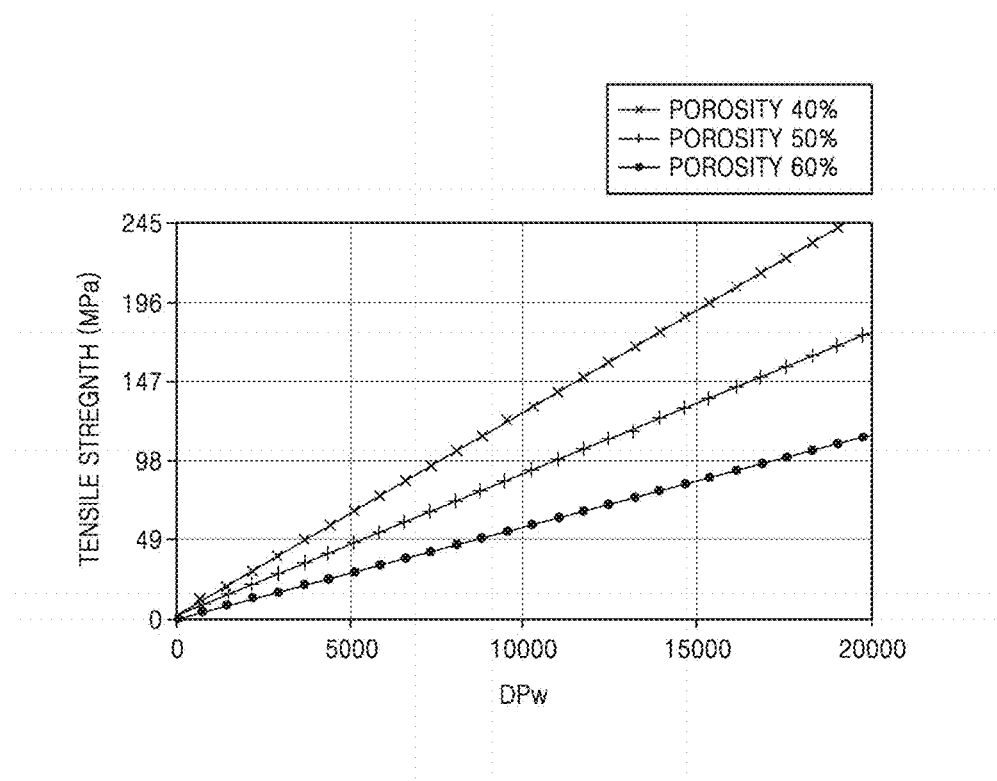
FIG. 3 is a graph of simulation results illustrating the relationship between DPw and tensile strength at different porosities.

FIG. 3 shows simulation results of a relationship between DPw and tensile strength according to different porosities. As shown in FIG. 3, as DPw increased, tensile strength increased.

(3) Test of Porosity and Air Permeability

Porosity of the separator manufactured in Section 1 was calculated by a weight measurement method according to the following equation. The used equation was Porosity (%)=[1−{(weight of sample (g))/(volume of sample (cm$^3$))× 1.6 (g/cm$^3$)}]×100. Herein, 1.6 g/cm$^3$ represents a density of the cellulose fiber. Further, air permeability of microbial cellulose was measured by a permeability tester (TOYOSEKI CO. Ltd., G-B3). Air permeability is expressed in terms of the gurley value. The gurley value is the period of time (sec) that is needed for 100 cc of air to permeate the separator, and is an index widely used for quantitative analysis of the pore structure of the separator. When pores of the separator are well formed, air easily permeates to show a low gurley value. Table 3 shows measured thickness, porosity, and gurley air permeability of M1 separator. Table 4 shows physical properties of Celgard #2320 which is a separator made from a synthetic polymer as a comparison of the bacterial cellulose nanofiber. Celgard #2320 is a commercially available separator having three polymer layers of PP/PE/PP.

TABLE 3

| Sample | Physical properties | Measured value |
|---|---|---|
| M1 | Thickness | 20 um |
|  | Porosity | 51% |
|  | Gurley air permeability (sec/100 c) | 350 |
|  | Initial charge capacity | 225 mAh |
|  | Initial discharge capacity | 199 mAh |
|  | Total discharge efficiency | 88.10% |
|  | Discharge capacity (0.2 C) | 194.5 mAh |
|  | Discharge capacity (5 C) | 163.7 mAh |
|  | Discharge load (5 C/0.2 C) | 84% |

Meanwhile, air permeability and porosity of M2 sample were 200 sec/100 cc and 50%, respectively.

TABLE 4

| Sample | Physical properties | Measured value |
|---|---|---|
| Celgard #2320 | Thickness | 20 um |
|  | Porosity | 39% |
|  | Gurley air permeability (sec/100 c) | 530 |
|  | Initial charge capacity | 230 mAh |
|  | Initial discharge capacity | 187 mAh |
|  | Total discharge efficiency | 81.20% |
|  | Discharge capacity (0.2 C) | 489 mAh |
|  | Discharge capacity (5 C) | 141 mAh |
|  | Discharge load (5 C/0.2 C) | 75% |

As shown in Tables 3 and 4, M1 separator has separator characteristics of excellent initial charge/discharge efficiency and excellent discharge load, compared to Celgard #2320 separator.

The electrical characteristics shown in Tables 3 and 4 were measured by a coin cell-type lithium ion battery including the above mentioned cellulose nanofiber separator between the positive electrode and the negative electrode. The positive electrode, the negative electrode, and the electrolyte used in the lithium ion battery are as follows.
Positive electrode: NCA(CSE222):DA187; Denka black: AN 1:BM720=98.875 (wt %), LL:10 mg/sq., ED:3-33, 13φ
Negative electrode: graphite (16.3φ)
Liquid electrolyte: 40 uL×2, EC/EMC/DMC=2/2/6 in 1.15M LiPF6, 0.5% VC, 1% AB43

Here, EC represents ethylene carbonate, EMC represents ethylene methylene carbonate, DMC represents dimethylcarbonate, and VC represents vinyl carbonate.

Figure 4:
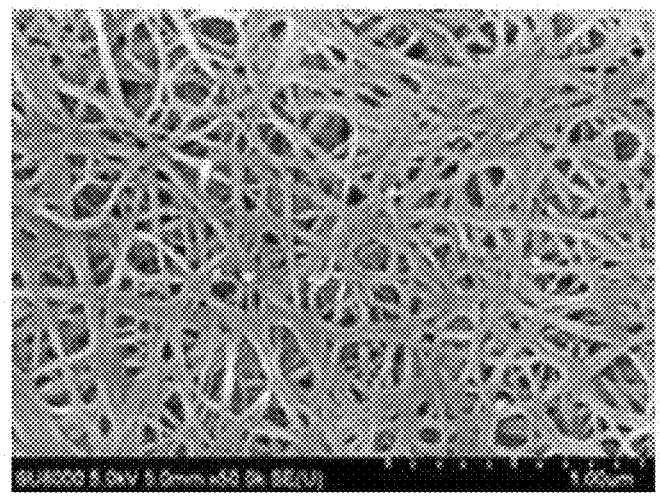
FIG. 4 shows scanning electron microscopy (SEM) (SU9000, Hitachi) of an M1 separator.
Figure 5:
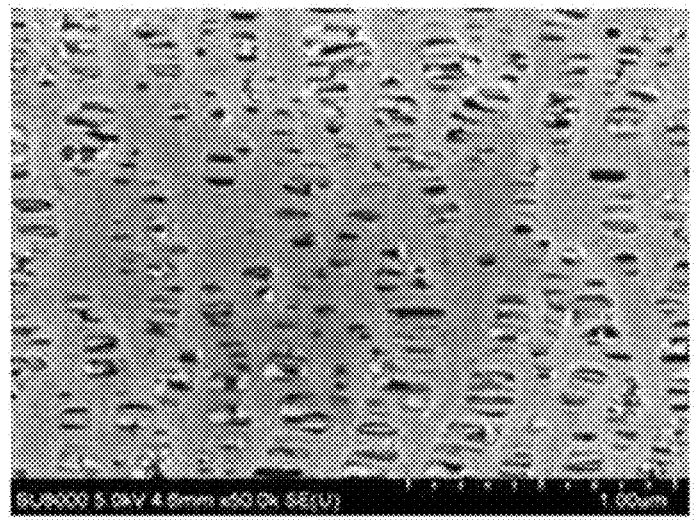
FIG. 5 shows scanning electron microscopy (SEM) (SU9000, Hitach) of a Celgard #2320 separator.

Further, the surfaces of M1 separator and Celgard #2320 separator were photographed by scanning electron microscopy (SEM) (SU9000, Hitachi). FIG. 4 shows scanning electron microscopy (SEM) (SU9000, Hitach) of the M1 separator. FIG. 5 shows scanning electron microscopy (SEM) (SU9000, Hitach) of the Celgard #2320 separator.

What is claimed is:

1. A separator comprising microbial cellulose nanofibers, wherein the separator has a tensile strength of 39 MPa to 290 MPa, and the cellulose nanofiber has an average degree of polymerization of about 4,000 to about 20,000,
and wherein the separator further comprises a binder comprising 2,2,6,6-tetramethylpiperidine-1-oxyl radical (TEMPO)-oxidized cellulose nanofibers.

2. The separator of claim 1, wherein the cellulose nanofiber has a diameter of about 4 nm to about 100 nm.

3. The separator of claim 1, wherein the cellulose nanofiber has a diameter of about 20 nm to about 50 nm.

4. The separator of claim 1, wherein the separator has a porosity of about 30% to about 70%.

5. The separator of claim 1, wherein the separator has an air permeability of about 50 sec/100 cc to about 2000 sec/100 cc.

6. The separator of claim 1, further comprising a cross-linking agent that cross-links the cellulose nanofibers.

7. The separator of claim 6, wherein the cross-linking agent comprises isocyanate, polyvinyl alcohol (PVA), polyamide epichlorohydrin (PAE), or combination thereof.

8. The separator of claim 1, wherein the binder comprises methyl cellulose, hydroxypropyl methyl cellulose, hydroxyethyl methyl cellulose, carboxyl methyl cellulose, ethyl cellulose, polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, polyvinylalcohol, or combination thereof.

9. The separator of claim 1, wherein the microbial cellulose is from a microorganism of the genus *Acetobacter, Gluconacetobacter, Enterobacter, Achromobacter, Agrobacterium, Alcaligenes, Azotobacter, Pseudomonas, Rhizobium, Sarcina, Klebsiella*, or *Escherichia*.

10. The separator of claim 1, wherein the microbial cellulose is from *Gluconacetobacter xylinum*.

11. A method of producing a separator of claim 1, the method comprising:
   culturing a microorganism to obtain a microbial cellulose; and
   preparing a separator comprising a cellulose nanofiber from the obtained microbial cellulose, wherein the separator has a tensile strength of 39 MPa to 290 MPa.

12. The method of claim 11, wherein preparing of the separator comprises passing the microbial cellulose through a microchannel while applying pressure thereto.

13. The method of claim 12, wherein the pressure is 10 MPa to 300 MPa.

14. The method of claim 12, further comprising pressing the cellulose nanofiber to provide a pressed, non-woven fabric that provides the separator.

15. A lithium ion battery comprising a separator according to claim 1.

16. The separator of claim 1, wherein the separator has a porosity of about 45% to about 90%.

* * * * *